US008797280B2

(12) United States Patent
Simmons et al.

(10) Patent No.: US 8,797,280 B2
(45) Date of Patent: Aug. 5, 2014

(54) SYSTEMS AND METHODS FOR IMPROVED TOUCH SCREEN RESPONSE

(75) Inventors: Martin John Simmons, Southampton (GB); Maciej Sebastian Pedzisz, Southampton (GB)

(73) Assignee: Atmel Corporation, San Jose, CA (US)

( * ) Notice: Subject to any disclaimer, the term of this patent is extended or adjusted under 35 U.S.C. 154(b) by 364 days.

(21) Appl. No.: 12/787,732

(22) Filed: May 26, 2010

(65) Prior Publication Data

US 2011/0291944 A1   Dec. 1, 2011

(51) Int. Cl.
*G06F 3/041* (2006.01)

(52) U.S. Cl.
USPC ............................................. 345/173

(58) Field of Classification Search
USPC .................. 345/173–184; 178/18.03–20.04
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2002/0080123 A1* | 6/2002 | Kennedy et al. | 345/173 |
| 2006/0097991 A1* | 5/2006 | Hotelling et al. | 345/173 |
| 2008/0012835 A1* | 1/2008 | Rimon et al. | 345/173 |
| 2009/0109191 A1* | 4/2009 | Felder et al. | 345/174 |
| 2009/0315854 A1 | 12/2009 | Matsuo | |
| 2010/0026656 A1* | 2/2010 | Hotelling et al. | 345/174 |
| 2012/0044150 A1* | 2/2012 | Karpin et al. | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Liliana Cerullo
(74) *Attorney, Agent, or Firm* — Baker Botts LLP

(57) ABSTRACT

This document discloses examples of systems, methods, and articles of manufacture that may provide one or more advantages relating to determining which touch on a touch screen is intended and which touch or touches are inadvertent.

19 Claims, 12 Drawing Sheets

SYSTEMS AND METHODS FOR IMPROVED TOUCH SCREEN RESPONSE

BACKGROUND

A position sensor is a device that can detect the presence and location of a touch, by a user's finger or by an object, such as a stylus, for example, within a display area of the position sensor overlaid on a display screen. In a touch sensitive display application, the position sensor enables a user to interact directly with what is displayed on the screen, rather than indirectly with a mouse or touchpad. Position sensors can be attached to or provided as part of computers, personal digital assistants (PDA), satellite navigation devices, mobile telephones, portable media players, portable game consoles, public information kiosks, and point of sale systems etc. Position sensors have also been used as control panels on various appliances.

There are a number of different types of position sensors/touch screens, such as resistive touch screens, surface acoustic wave touch screens, capacitive touch screens etc. A capacitive touch screen, for example, may include an insulator, coated with a transparent conductor in a particular pattern. When an object, such as a user's finger or a stylus, touches or is provided in close proximity to the surface of the screen there is a change in capacitance. This change in capacitance is sent to a controller for processing to determine the position of the touch on the screen.

In recent years, touch sensitive position sensors have been used in large screens, such as tablet PC's. When a user interacts with large touch screens, they may often inadvertently touch the screen, such as with one or more fingers and/or the palm of the hand while writing on the screen with a stylus. Even when intending to touch the screen with only an index finger, a user may also touch the screen with another finger or another part of the hand. Detection of an inadvertent, unintended, accidental, or otherwise non-purposeful touch may lead to a device operation or response that is different from what would have occurred had the user touched only the intended position of the touch screen.

SUMMARY

The following disclosure describes examples of systems, methods, and articles of manufacture that may provide one or more advantages relating to determining which touch on a touch screen is intended and which touch or touches are inadvertent.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

In the examples, when a touch screen detects multiple concurrent touches from one or more objects, a controller analyzes one or more parameters of the touches, such as area or size of each detected touch and/or distance(s) between detected touches. From the analysis, the controller identifies and responds to a detected touch meeting criteria for an intended touch. The controller may also suppress response to any concurrent touch that does not meet the criteria. In this way, it is possible to suppress response to at least some touches of the screen that may have been non-purposeful (e.g., accidental, unintended, inadvertent, or otherwise not meant to cause a responsive action at the computing device).

Figure 1:
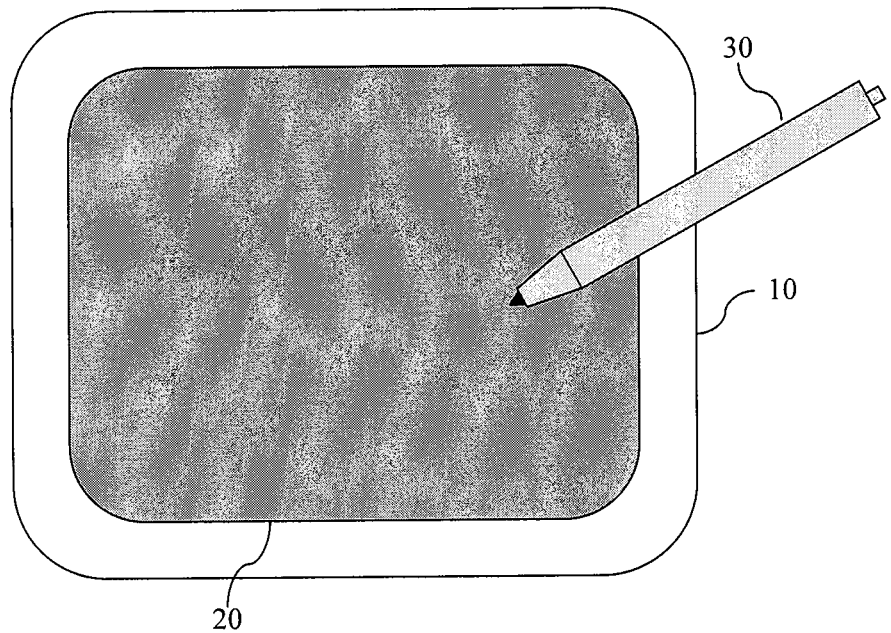
FIG. 1 illustrates schematically a touch pad, including a touch sensitive screen, as well as a stylus touching the screen.

Reference now is made in detail to the examples illustrated in the accompanying figures and discussed below. FIG. 1 illustrates schematically a computing device 10 such as a tablet PC having a touch sensitive screen 20 enabling a user to interact with the screen using the stylus 30 or another device such as a user's finger etc. The present teachings can also be used in conjunction with other types of computing and programmable devices that may incorporate a touch screen type user input device. Examples include, but are not limited to personal digital assistants (PDA), mobile telephones, and personal computing devices.

Figure 2:
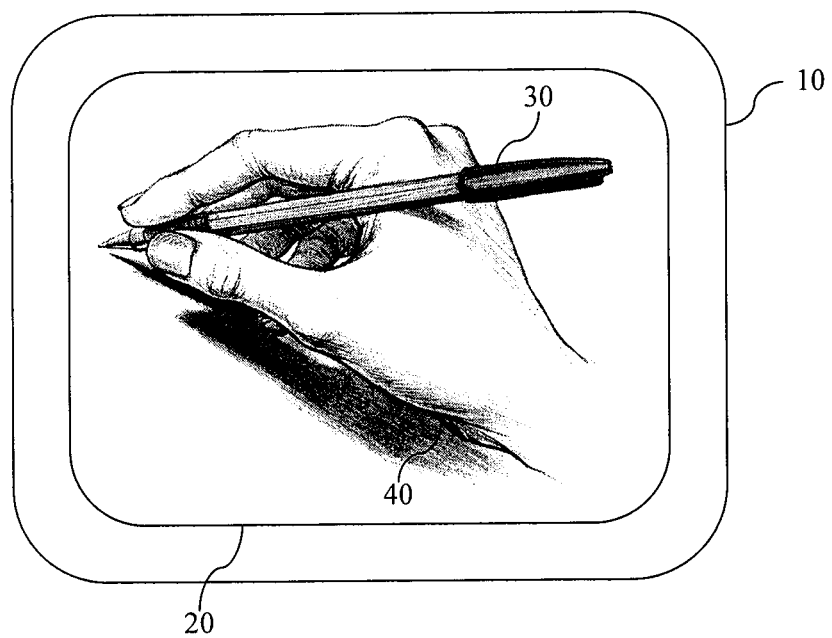
FIG. 2 illustrates schematically a touch pad, including a touch sensitive screen, as well as a hand touching the screen using the stylus in proximity to the screen.

As illustrated in FIG. 2, when a user interacts with the touch sensitive screen 20 (for example, by writing and/or drawing on the touch sensitive screen 20), the user's hand and palm 40 may be in close proximity to or in contact with the surface of the touch sensitive screen 20. This contact or close proximity of the user's hand/palm 40 with the touch sensitive screen 20 may be interpreted as a touch on the screen by the supporting electronics of the touch screen 20 or computing device. However, the user does not usually intend the contact/close proximity of their hand/palm 40 to result in touches at the screen, because the user typically intends the screen to only interpret the contacts made by the stylus 30 (or the user's finger) on the touch sensitive screen 20. Other objects that come in contact with the screen can be interpreted as a touch on the screen too.

Figure 3:
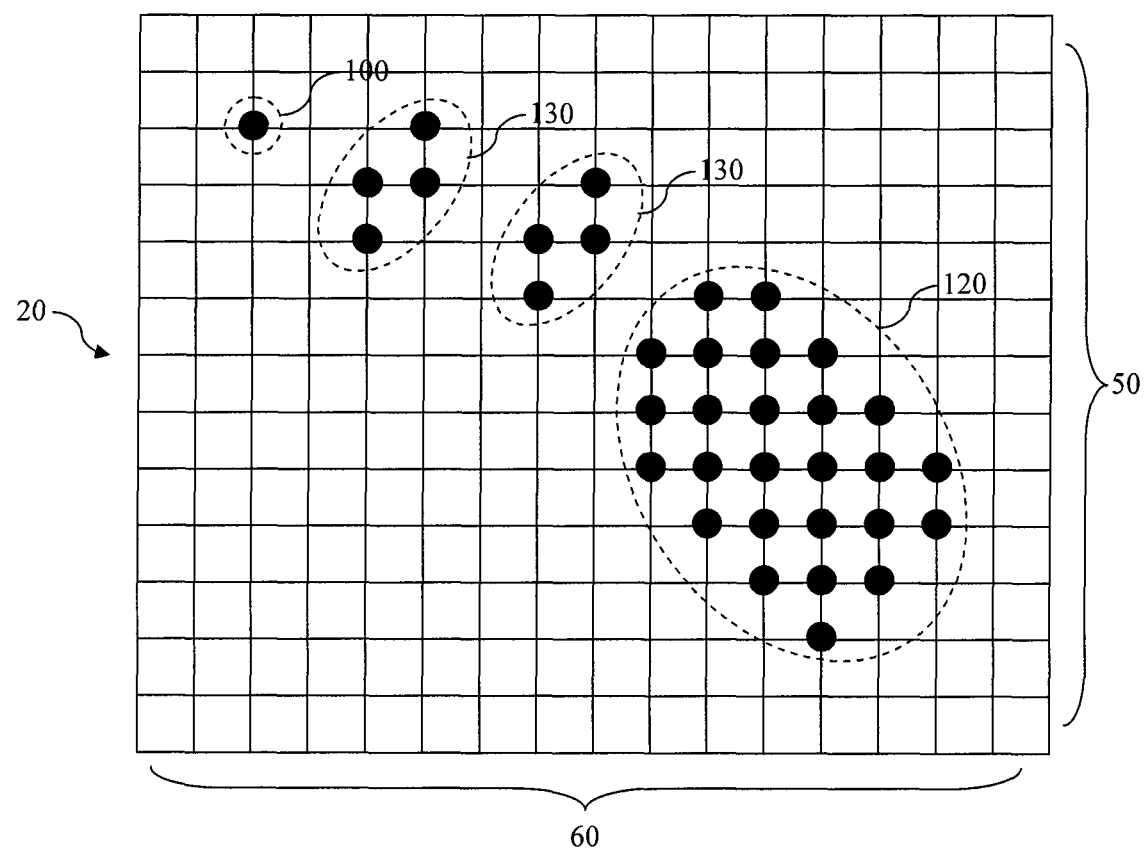
FIG. 3 illustrates schematically touches detected at a touch sensitive screen.

FIG. 3 illustrates schematically several exemplary touches detected at a touch screen 20 when a user, some portion of a user, or some other object interacts with the touch screen 20. A capacitive example of a touch screen 20 typically includes a grid of electrodes arranged such that a touch can be detected at each of a plurality of nodes formed by capacitive couplings between the electrodes. As shown below with respect to FIG. 11, the panel 20 is supported by associated electronics that determine the location of the various touches. Referring back to FIG. 3, a capacitive node is formed at the insulated intersection of each horizontal electrode 50 with each vertical electrode 60, however, numerous different arrangements of electrodes can be utilized.

In FIG. 3 each black circle indicates that an object has contacted the screen at that node (e.g., detected by a change in capacitance at that node). Various objects that touch the screen can actually cause more than one node to indicate a change. For example, a single touch by a finger can cause one, two, four, or some other number of nodes to change state. The spacing of the nodes can affect the number of nodes that report a chance in response to a touch from an object.

As can be seen from FIG. 3, there are several different areas 100, 120, 130 of the screen where proximity or contact by an object has been detected. The areas typically include one or more groups of nodes that indicate an object touching or brought into proximity to the screen 20. The pattern in FIG. 3 is a somewhat stylized representation of a pattern of the nodes that might detect touching by the stylus 30 and the hand 40 in FIG. 2. As shown in FIG. 3, the area 100 indicates the contact or proximity detected from the end of the stylus 30, the user's finger, or some other typically sharp pointing object. Areas 130 indicate contact or proximity caused by two of the user's fingers resting or provided close to the touch screen 20. Area 120 indicates contact or proximity caused by the user's hand or palm 40 resting or provided near to the touch screen 20.

Each area 100, 120, 130 which contains at least one black circle is considered a representation of the object that caused the node to change state. The black circle represents a change in state at the node as a result of a physical object contacting or coming in close proximity to the screen at the nodes location. These changes in state can be thought of as touch detections. The touch detections can be grouped into one or more detected objects which correspond to the physical object that generated the touch detections. The detected objects represent actual physical objects but are instead defined in terms of touch detections.

The supporting electronics of the panel execute various methods and procedures to group the touch detections into different detected objects. For example, the supporting electronics can use the number of adjacent touch detections as a means to group the detected touches into different detected objects. Also, detected objects can be determined by pattern recognition. That is the various touch detections can be compared to various predetermined patterns of touch detections to determine whether or how to group the touch detections into one or more detected objects.

The touch detections that represent detected objects at the areas 130 and 120 may be suppressed (e.g., not report to other electronics of the computing device), because the user may not have intend that the touches by the physical objects in these areas be used to control the operation of the computing device. The touch detections are used to generate detected objects, and in response to determining a characteristic of the detected objects (e.g., size, shape, and so on), the touch detections may not be reported to other components of the computing device 10. Thus, a pointing device displayed to a user on the display of the computing device does not erroneously move. Various methods, systems, and articles of manufacture can be used to suppress these unintended touches.

Figure 4:
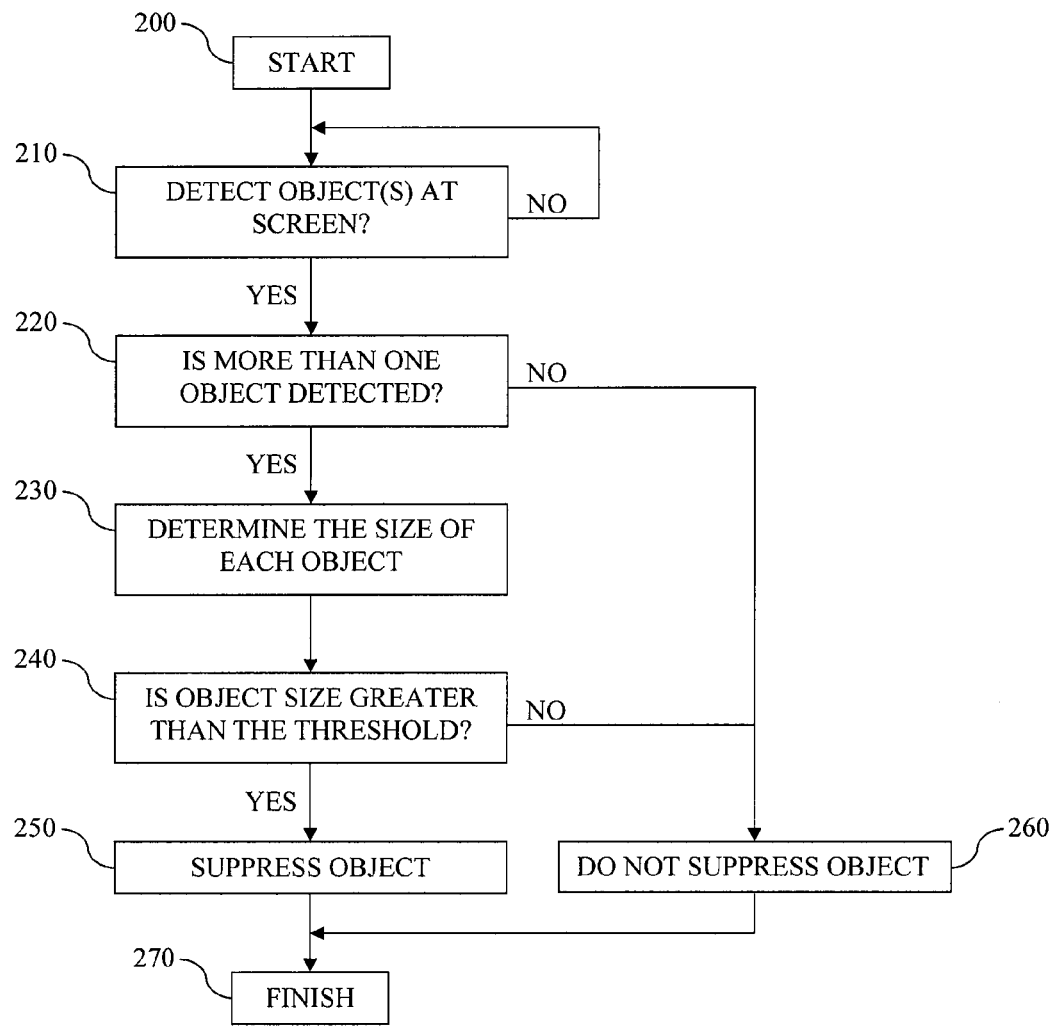
FIG. 4 is a flow chart depicting an example of a process for suppressing non-purposeful touches detected at a touch sensitive screen.

In one example, FIG. 4 illustrates a method for determining whether to suppress the touch detections resulting from a physical object touching or in close proximity to the touch screen 20 based on the size of the detected object (s). The size of a detected object can be expressed in several different ways. For example, the size of each detected object may be expressed as the number of nodes that reported a touch by the physical object (that is, the number of touch detections); or the size of the detected object may be expressed as actual size in various units such as meters or inches. In addition, determination as to whether the detected object is a large object may be determined based on the size of the touch screen 20 and the density of the nodes of the touch screen 20.

As illustrated in FIG. 4, the process begins at step 200. At step 210 the method determines whether one or more physical objects have screen touched or have come in close proximity to the screen by determining whether there are any detected objects. Hereinafter, when described as touching, it should be understood that an object item in close proximity to the screen can also result in the detection of a touch by that physical object. Thus, touching does not require physical contact with the screen 20. Whether a physical object has touched the screen can be determined, for example, based on the number of touch detections. As stated above, the detected touches are, in some examples, grouped into detected objects. A detected object typically corresponds to an actual physical object.

If no objects are detected, then the process returns to step 200. If one or more objects are detected, then the process moves to step 220. At step 220 the method determines whether more than one physical object touched the screen by determining, as described above, whether one ore more detected objects results from the group of touch detections. If a single detected object results, then the process moves to step 260 and the detected touch associated with the detected object is not suppressed. However, if a touch from more than one physical object is detected, then the process moves to step 230.

At step 230 the method includes determining the size of each detected object. As stated above the size may be determined using various methods. For example, the size can be determined by counting the number of touch detections associated with the each detected object.

Although shown as only one step, a threshold comparison is performed with respect each of the detected objects, which may entail a number of comparisons of object sizes to the threshold. Hence, in step 240, the method determines whether the size of each of the detected objects exceeds a predetermined size threshold. In another example, the size can exceed or be substantially equal to the threshold. If a detected object's size does not exceed the predetermined threshold, then the process moves to step 260, and the touch detections associated with the detected object are not suppressed. For example, the touch detections for certain detected objects may be reported to higher level logic of the tablet computer 10 as a user input, for processing an responsive action. However, if a detected object's size exceeds the predetermined threshold, then the method determines that a large physical object (e.g., a palm or hand) has touched that portion of the screen 20, and the associated touch detections should be suppressed. In one example, a 10.5 inch screen may contain thirty-three drive electrodes and forty-two sense electrodes provided at a density of five mm. In this example, the predetermined size threshold may be set as thirty-six nodes. Thus detected objects that are determined to have thirty-six or more than thirty-six touch detections associated therewith are determined as large detected objects (and by extension large physical objects) and reporting of the associated touch detections is suppressed.

At step 250 the touch detections associated with the large detected object are suppressed (e.g., the touch detections are not reported by the supporting electronics to other components of the computing device), and the touch detections associated with large detected objects 120, 130 are not used to control the computing device 10. Therefore, when more than one detected object is determined, the touch detections associated with each detected object having a size that exceeds a size threshold is suppressed and each detected object that has a size below the threshold is not suppressed. Finally, the process ends at step 270. In one example of the process of FIG. 4, step 220 is skipped.

With reference to FIG. 3, the process of FIG. 4 suppresses response to detected objects 120 and 130 as both of these detected objects have a size that exceeds the threshold. However, detected object 100 has a size that does not exceed the threshold thus the touches associated with object 100 are not suppressed. As a result, the path of the physical object associated with detected object 100 (e.g., the user's stylus or finger) can be accurately tracked without interference and used to control various operations of the computing device 10 In one example, the detection of objects at a screen 20 is performed on a cycle by cycle basis, i.e. objects are detected at the screen every 10 m seconds, although other cycle timings may be utilized. Therefore it is possible to check the path of an object at the screen by recording the position of the object every cycle.

The method of FIG. 4 suppresses the touch detections associated with detected objects that are larger than a predetermined size threshold. In this way, it is possible to suppress any unintentional touches caused by physical objects such as the user's hand or palm when they interact with the touch sensitive screen 20 of the computing device 10.

As stated above, determination as to whether the physical object (and resulting detected object) is a large object may be determined based on the size of the touch screen 20 and the density of the nodes of the touch screen 20. For example, when using a screen with a high density of nodes, an object which is represented by a plurality of nodes, may not in fact be that large. Therefore, the size threshold may be set based on the size and density of the screen and may also be adjustable by the user of the device. For example, different users may have different sized hands and therefore may wish to adjust the threshold of what is considered a large object.

Figure 5:
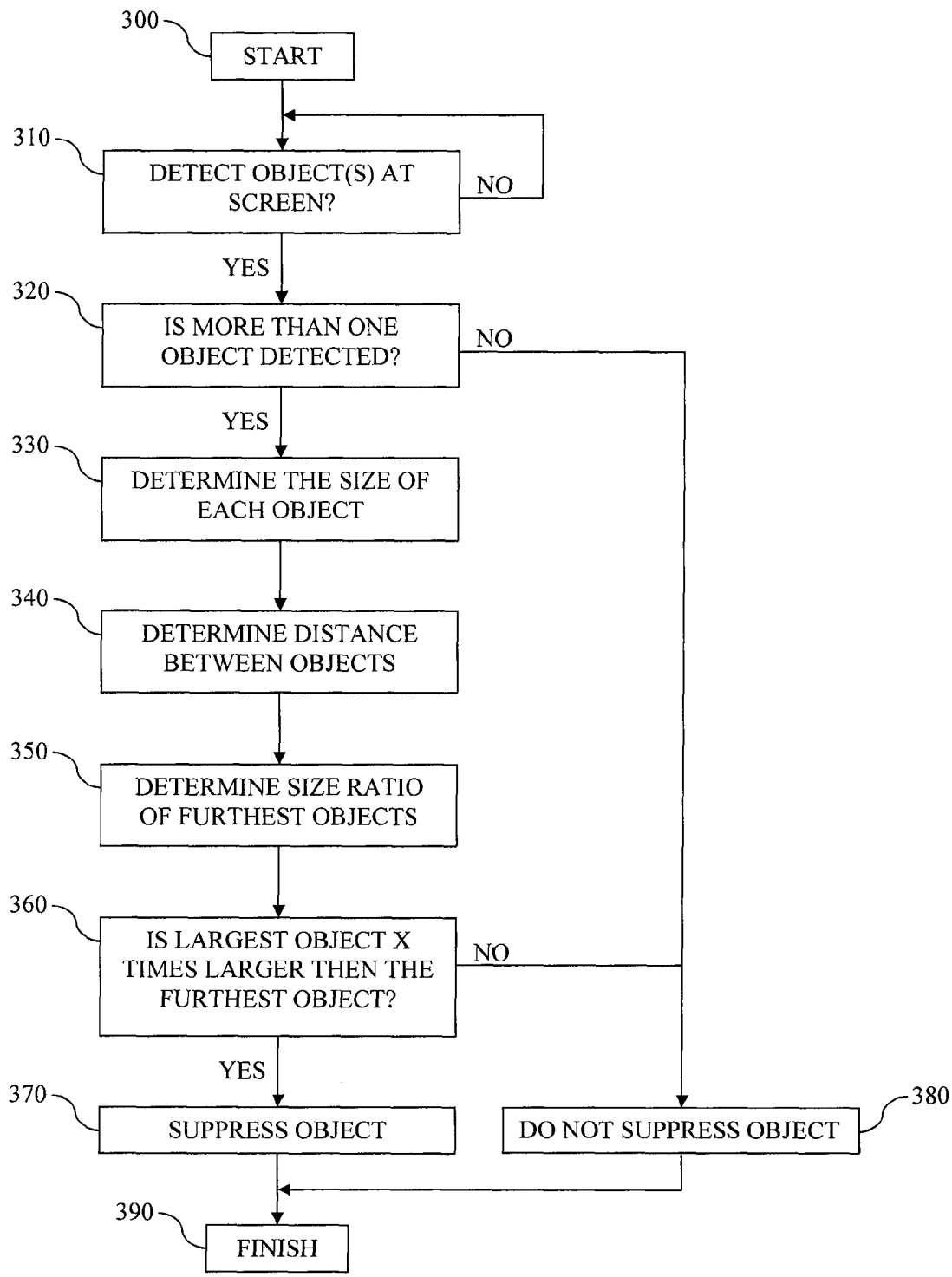
FIG. 5 is a flow chart depicting another example of a process for suppressing non-purposeful touches detected at a touch sensitive screen.

FIG. 5 illustrates another example of a method of determining whether to suppress the touch detections associated with a detected object. The method of FIG. 5 determines a ratio of the size of the two detected objects furthest from one another. For example and with reference to FIG. 6, detected objects 100 and 120 are the two furthest detected objects on the screen 20, at a distance D away from each other. Also, detected object 100 is smaller than detected object 120. If the size of each detected object is determined as the number of touch detections (e.g., nodes) associated with each detected object, then the detected object 100 is one touch detection big, and the detected object 120 is twenty-six touch detections big. Using these size parameters, a choice can be made as to which item is more likely used by the user as a means to control operation of the computing device 10.

As illustrated in FIG. 5, the process begins at step 300. At step 310 the process determines whether one or more physical objects have touched the screen 20. Various methods of object detection have been explained above and are not repeated hereafter. If no physical objects are detected, then the process returns to step 300. If one or more physical objects are detected, then the process moves to step 320. At step 320 the process determines whether more than one physical object is detected. If only one physical object has been detected, then the process moves to step 380 and the touch detections associated with the detected object that corresponds to the physical object are not suppressed. However, if multiple physical objects are detected, then the process moves to step 330. At step 330, the size of each detected object is determined. As before, the size of each detected object can vary from the size of the actual associated physical object. As stated above the size may be determined using various methods.

At step 340, the distance between the detected objects is determined. The distance can be computed by the supporting electronics of the touch panel or other components of the computing device 10. Various methods of distance computation can be employed. For example, using the known node density of the panel 20 the physical distance between various points of the respective detected objects can be computed. When multiple detected objects are detected all or some of the distances among each of the detected objects are computed in order to determine which detected objects have the greatest distance between them. Other techniques can also be used.

Figure 6:
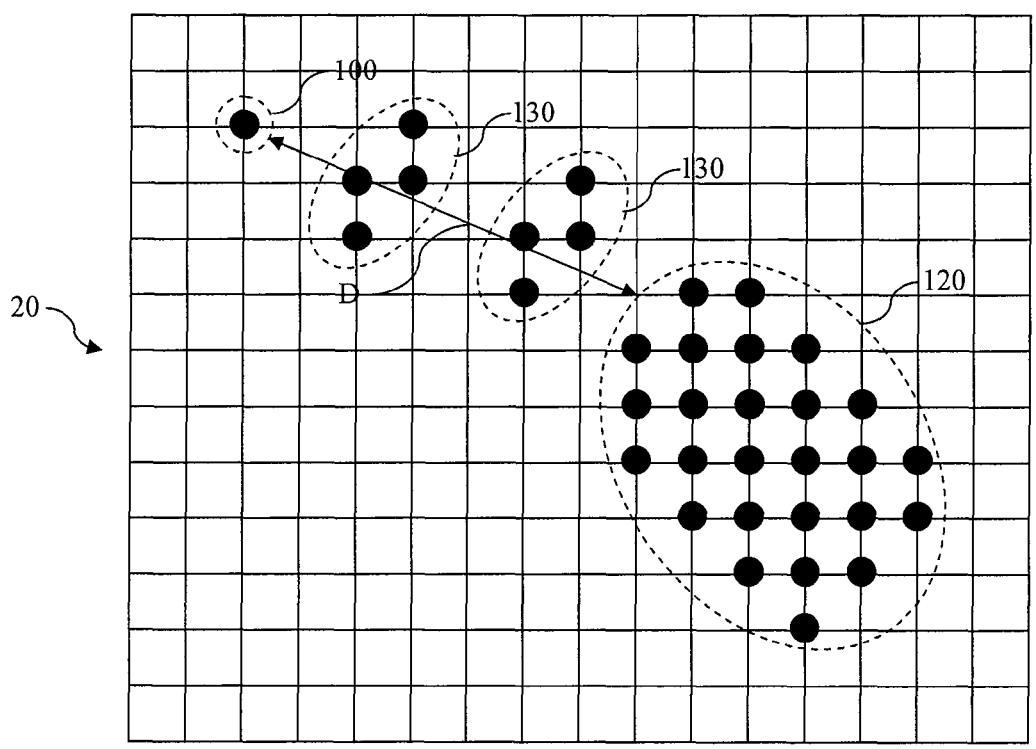
FIG. 6 illustrates schematically touches detected at a touch sensitive screen.

At step 350 the ratio between the size of the two furthest detected objects is determined (for example the ratio of the size of detected object 100 and detected object 120 of FIG. 6). Again, the ratio can be computed using the supporting electronics of FIG. 11 or other electronics (not shown) of the computing device 10.

At step 360, the process determines whether the largest detected object is a predetermined amount larger than the furthest detected object. The predetermined amount may be set based on the size and density of the touch screen and may be adjustable by the user. For example if the largest detected object is three times larger than the size of the furthest detected object, then the touch detections associated with the largest detected object is suppressed at step 370. However, if the largest detected object is not three times larger than the furthest detected object, then the touch detections associated with the largest detected object is not suppressed at step 380.

The process ends at step 390. In one example of the process of FIG. 5, step 320 is not executed.

In summary, the process of FIG. 5 determines whether the size of the furthest detected object is a predetermined amount smaller than the largest detected object. As such, it can be assumed that the furthest area of touch detections, which are a predetermined amount smaller than the largest detected object, correspond to a touch from, for example, a stylus or tip of a finger and not part of the user's palm.

Figure 7:
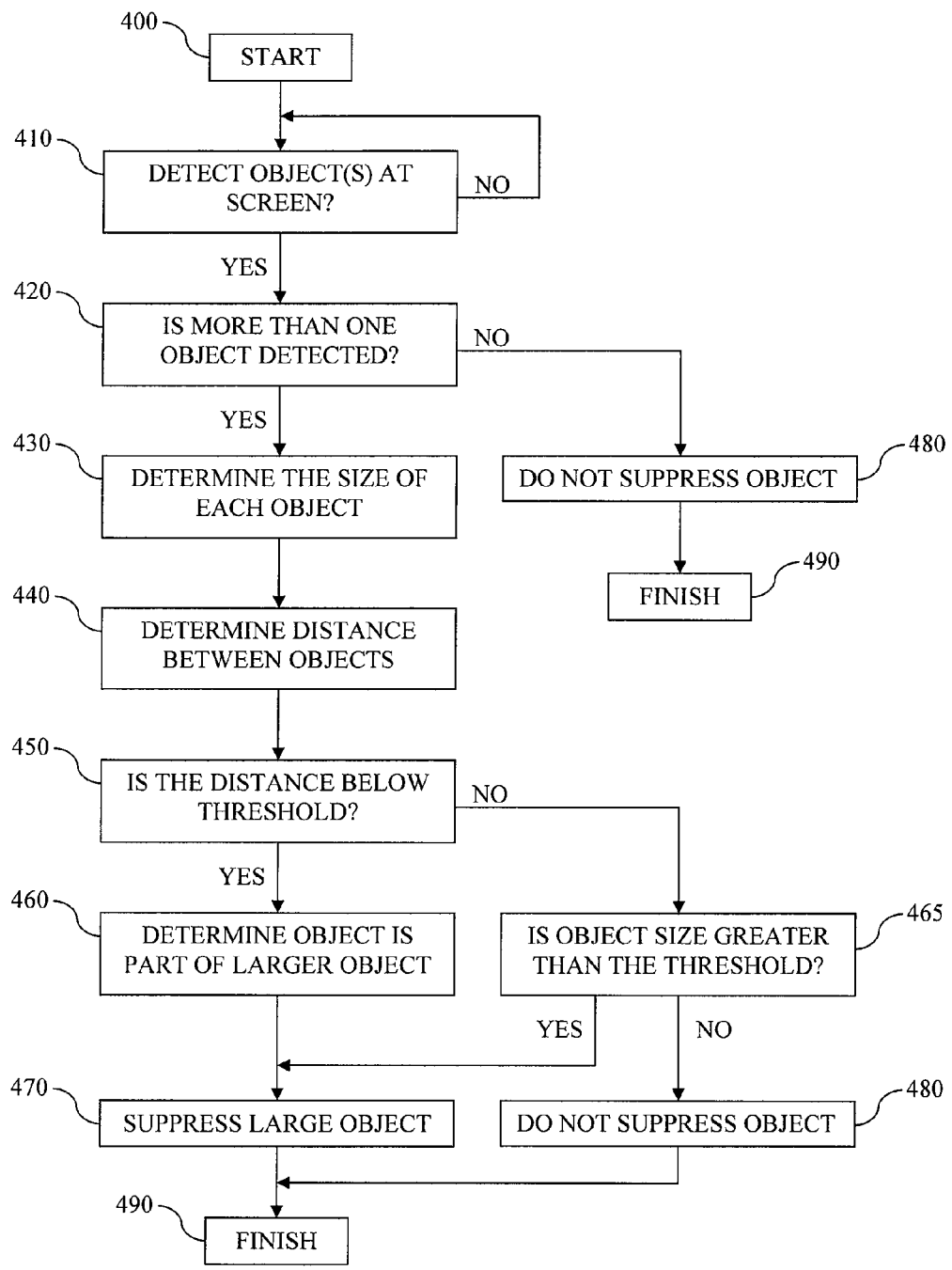
FIG. 7 is a flow chart depicting another example of a process for suppressing non-purposeful touches detected at a touch sensitive screen.

In some cases, a small detected object may actually be part of a large detected object. For example, because of the orientation of a palm or hand the panel and associated electronics may actually indicate both a small detected object and large detected object. FIG. 7 illustrates another method for determining whether to suppress the touch detections associated with a detected object. The method of FIG. 7 determines a distance between one or more detected objects and then determines whether some of the separate detected objects in fact form part of one larger detected object. For example, two detected objects collectively correspond to one physical object. In such a case, categorizing both detected objects as one large object, even though separately one or more of the detected objects is small, allows the suppression of the touch detections associated with both detected objects.

Figure 8:
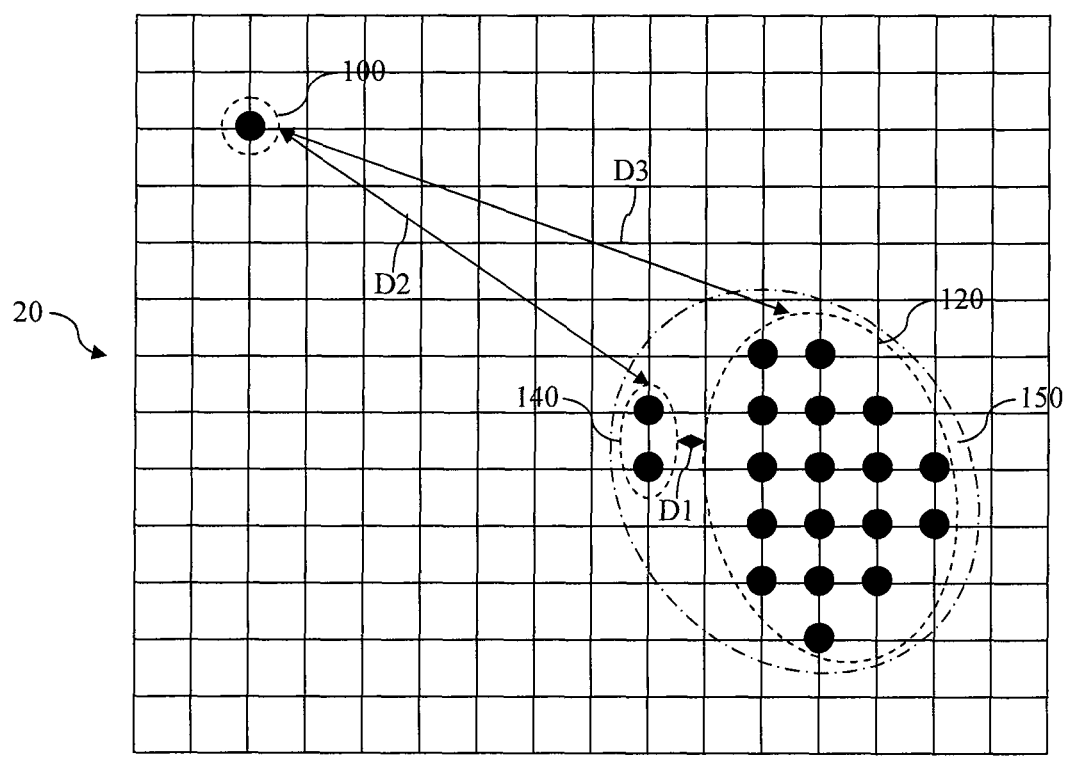
FIG. 8 illustrates schematically touches detected at a touch sensitive screen.

With reference to FIG. 8, detected objects 100, 120 and 140 (indicated with dotted lines) are determined based on the touch detections, as previously described. The method of FIG. 7 determines the size of each detected object and the distance between each detected object. If the distance D1 between detected objects 140 and 120 is relatively small (below a predetermined threshold), the method determines that the detected objects 140 and 120 in fact are one large detected object (e.g., detected object 150 indicated with the dot-dash line).

As illustrated in FIG. 7, the process begins at step 400. At step 410 the process determines whether one or more physical objects have touched the panel 20 using the previous described techniques related to grouping touch detections into detected objects. If no physical objects are detected, then the process returns to step 400. If one or more physical objects are detected, then the process moves to step 420. At step 420 it is determined whether more than one physical object has been detected. If only one detected object results, then the process moves to step 480 and the detected object is not suppressed. However, if more than one detected objects results, then the process moves to step 430. At step 430 the size of each detected object is determined. As stated above the size of the detected object may be determined using any of a number of methods.

At step 440 the distance between each of the detected objects is determined. As before, any of the previously described or know methods for determining the distance between two detected objects can be used. At step 450 it is determined whether any of the distances between each detected object (e.g. distances D1, D2, D3 illustrated in FIG. 8) do not exceed a predetermined distance threshold. This distance threshold is used to determine whether it is likely that the separate detected objects are close enough that each is likely part of a large detected object. If none of the distances are below the distance threshold, then the process moves to step 465. However, if any of the distances are below the threshold, then it is determined that each of the detected objects (separated by the distance which is less than the threshold) in fact form part of one larger detected object at step 470. The touch detections associated with each of the detected objects which form part of the one larger detected object are suppressed.

For those detected objects where the distance between those detected objects exceeds (or in some instances is equal to) the distance threshold, the sizes of the respective detected objects is again used to determine whether the detected object is large and requires suppression of the associated touch detections. At step 465 the process determines whether the size of any of the individual detected objects exceeds (or in some instances is equal to) a predetermined size threshold. If the detected object's size is not above the predetermined size threshold, then the process moves to step 480 and the detected object is not suppressed. However, if the detected object's size is above the predetermined size threshold, then it is determined that the object is a large object and the touch detections associated with the detected object should be suppressed a step 470. Finally, the process ends at step 490. In one example of the process of FIG. 7, step 420 is optional and therefore can be skipped.

In some situations, the palm or the other large physical object may be not close enough to cause a touch detection at a node. Therefore to improve the accuracy of the panel 20 the sensitivity of whether a touch detection occurs at a node can be adjusted. For example, each node can have both a full-detection threshold and half-detection threshold associated therewith. As explained in further detail below both thresholds can be used to determine whether a large physical object touched the panel 20.

Figure 9:
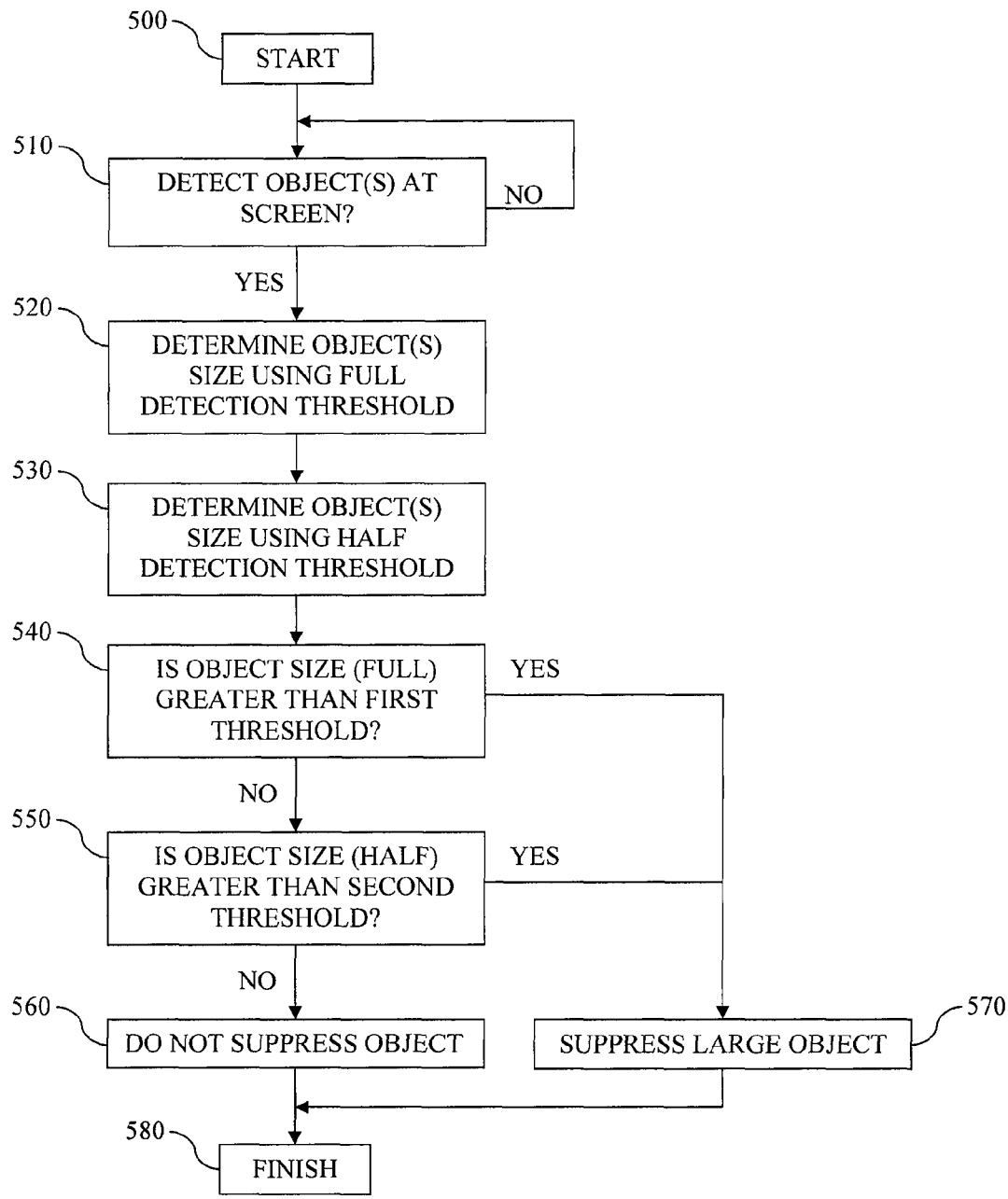
FIG. 9 is a flow chart depicting another example of a process for suppressing non-purposeful touches detected at a touch sensitive screen.

FIG. 9 illustrates another method of determining whether to suppress touch detections associated with a detected object, and by extension a physical object. As illustrated in FIG. 9, the process begins at step 500. At step 510 the process determines whether one or more physical objects have been detected at the screen by sensing the nodes of the panel 20. Again, physical objects can cause the change in state at a node and thus result in a touch detection at that node. If no physical objects are detected, then the process returns to step 500. If one or more physical objects are detected, then the process moves to step 520.

At step 520 the size of the one or more detected objects is determined using a full-detection threshold. A touch may be detected at a screen using any one of several methods and thereby generate a touch detection at a respective node. When using capacitive sensing a touch is determined when a change in capacitance is detected. However, a threshold amount of capacitive change is set above which a change of capacitance is determined to indicate a touch and below which a change of capacitance is determined not to indicate a touch. The full-detection threshold is the threshold set above which a change is determined to indicate a touch and thereby generate a touch detection. Although capacitance sensing is described in this example, the method of FIG. 9 can equally be applied to other touch detection methods. The process can also include an additional step before step 520, where the process determines whether there is more than one detected object. If a single detected object exists then the detected touches object are not suppressed and the process ends.

Figure 10:
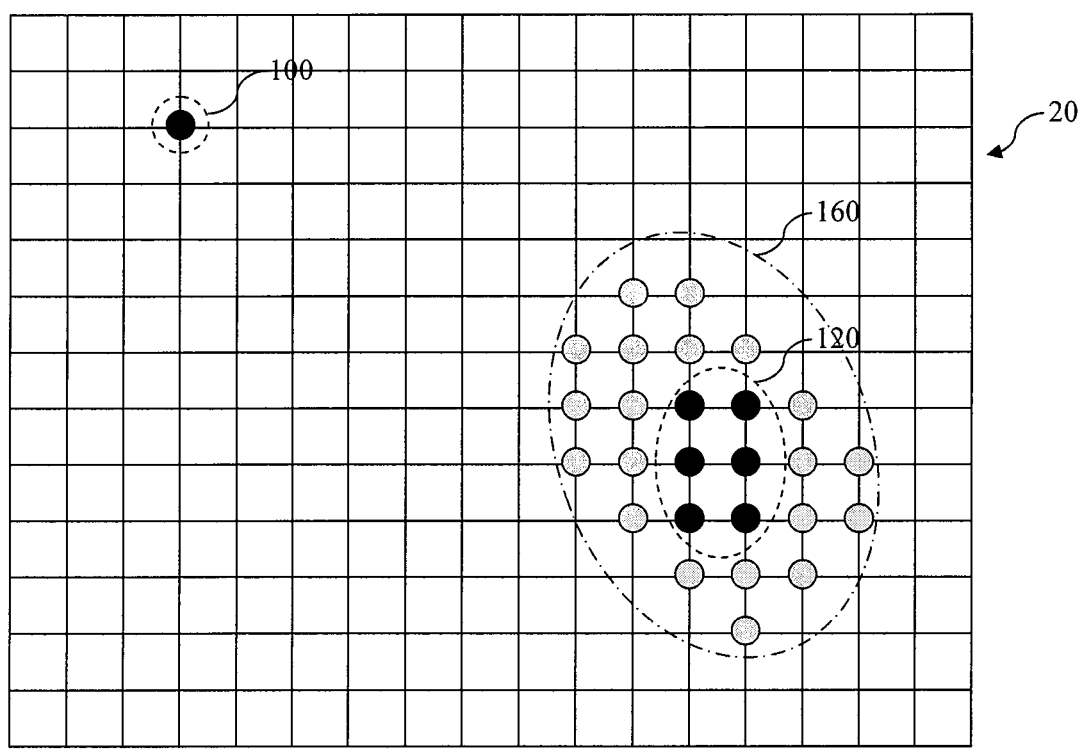
FIG. 10 illustrates schematically touches detected at a touch sensitive screen.

At step 530 the size of the one or more detected objects is determined using the half-detection threshold. In various examples, the half-detection threshold refers a threshold that is set to be substantially one half a full-detection threshold. Other fractions of the full-detection threshold can be used. The full-detection threshold and half-detection threshold refer to, in one example, a level change in capacitance required to generate and indicate a touch detection at a node. The size of a detected object using the half-detection threshold should be larger than the size of a detected objected using the full-detection threshold, because the half-detection threshold is lower in magnitude and will result in more touch detections being determined at the nodes. For example, as illustrated in FIG. 10, when the full-detection threshold is used, detected objects 100 and 120 result. However, when using the half-detection threshold, detected objects 100 and 160 result. The detected object 160 incorporates detected object 120, and is a larger area because of the lower half-detection threshold was used to generate a touch detection at the respective nodes. In contrast to a large physical object, a smaller physical object with a relatively sharp point (e.g., the tip of a stylus), such as small physical object 120, tend to produce relatively few, if any, additional touch detections when the half-detection threshold is used.

At step 540 it is determined whether the size of the detected object(s) using the full-detection threshold is greater than a full-detection-size threshold. The full-detection-size threshold refers to, in one example, the number of touch detections sensed at nodes that sense a touch based on the full-detection threshold. If the detected object exceeds, or in some instances is equal to, the full-detection-size threshold, then the process moves to step 570 and the detected touches associated with the detected object is suppressed, because the detected object is determined as a large object. However, if the detected object does not exceed, or in some instances is equal to, the full-detection-size threshold, then the process moves to step 550.

At step 550 the process determines whether the size of a detected object resulting from the use of the half-detection threshold exceeds, or in some instances is equal to, a half-detection-size threshold. If the detected object is larger than the half-detection-size threshold, then the process moves to step 570 and the touch detections associated with the object are suppressed, because the detected object is deemed a large object. However, if the detected object does not exceed, or in some instances is equal to, the half-detection-size threshold, then the process moves to step 560 and the detected touches associated with the object are not suppressed. Finally the process is finished at step 580.

In some instances, the process of FIG. 9 is useful when a user interacts with a touch screen and a small part of their hand or palm is actually in contact with the touch screen 20. However, other parts of the user's hand or palm are provided close to the touch screen as indicated using the half-detection threshold. Therefore, it is possible to determine when a touch associated with an object should be suppressed even when a only small part of the user's hand or palm is detected using the full-detection threshold.

Once an object is detected at the screen and the touch detections associated with large detected objects are suppressed, the computing device 10 tracks the movement of one or more physical objects that are not suppressed. For example, if a stylus is provided at a first position and is gradually moved by the user towards a palm area, the palm area reported touches being suppressed, rather then the stylus being merged with the palm at a certain point and suppressed, it is tracked as a separate object since it has already being determined that it is the stylus and not part of the palm. In this way, the touch screen uses historical data stored in a memory to interpret a touch. The memory can be part of the supporting electronics or the computing device 10.

In one example, the touch screen 20 and any incorporating computing device 10 can use some, all, or various combination of the methods illustrated in FIGS. 4, 5, 7 and 9, so that an accurate assessment can be made as to whether touches associated with a detected object should be suppressed or not, and whether touches associated with those detected objects should be tracked.

Figure 11:
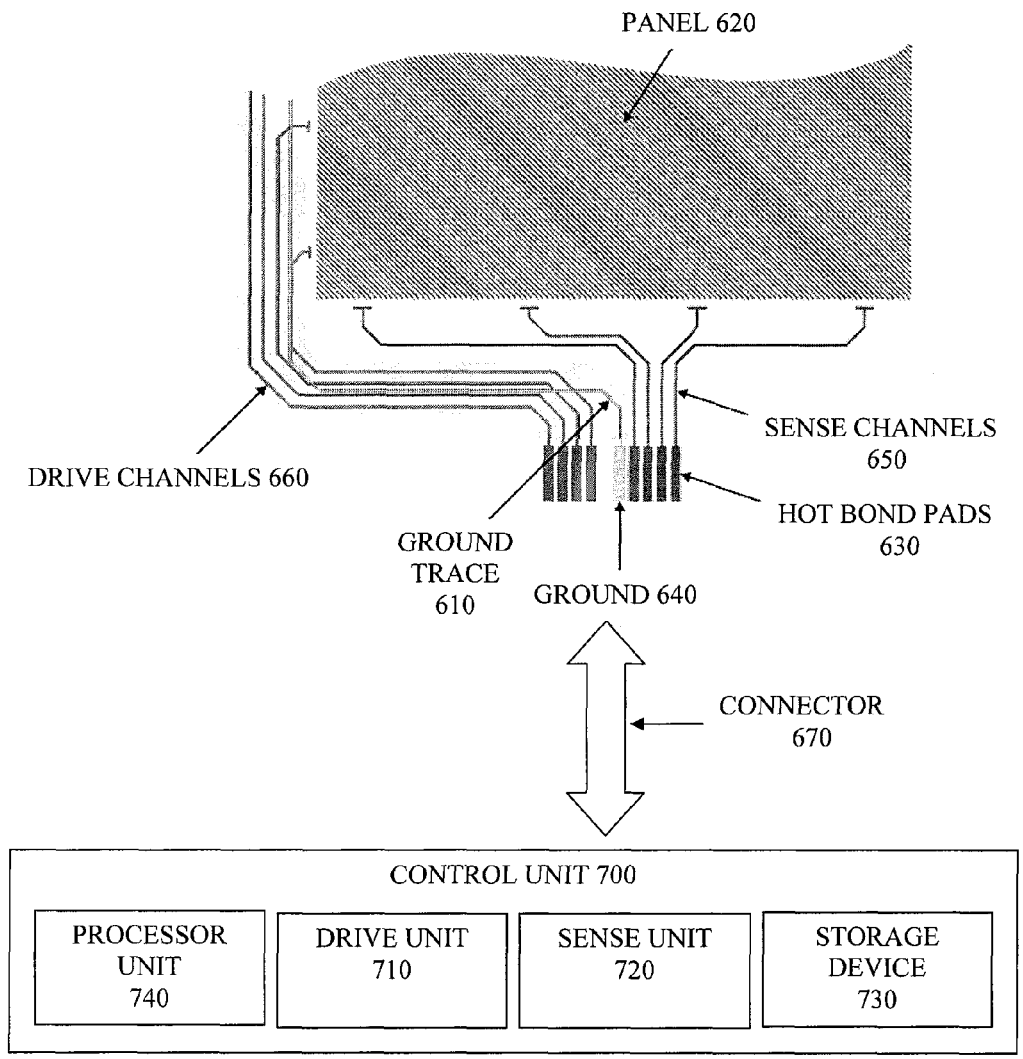
FIG. 11 illustrates schematically apparatus for detecting and processing a touch or touches at a touch sensitive screen.
Figure 12:
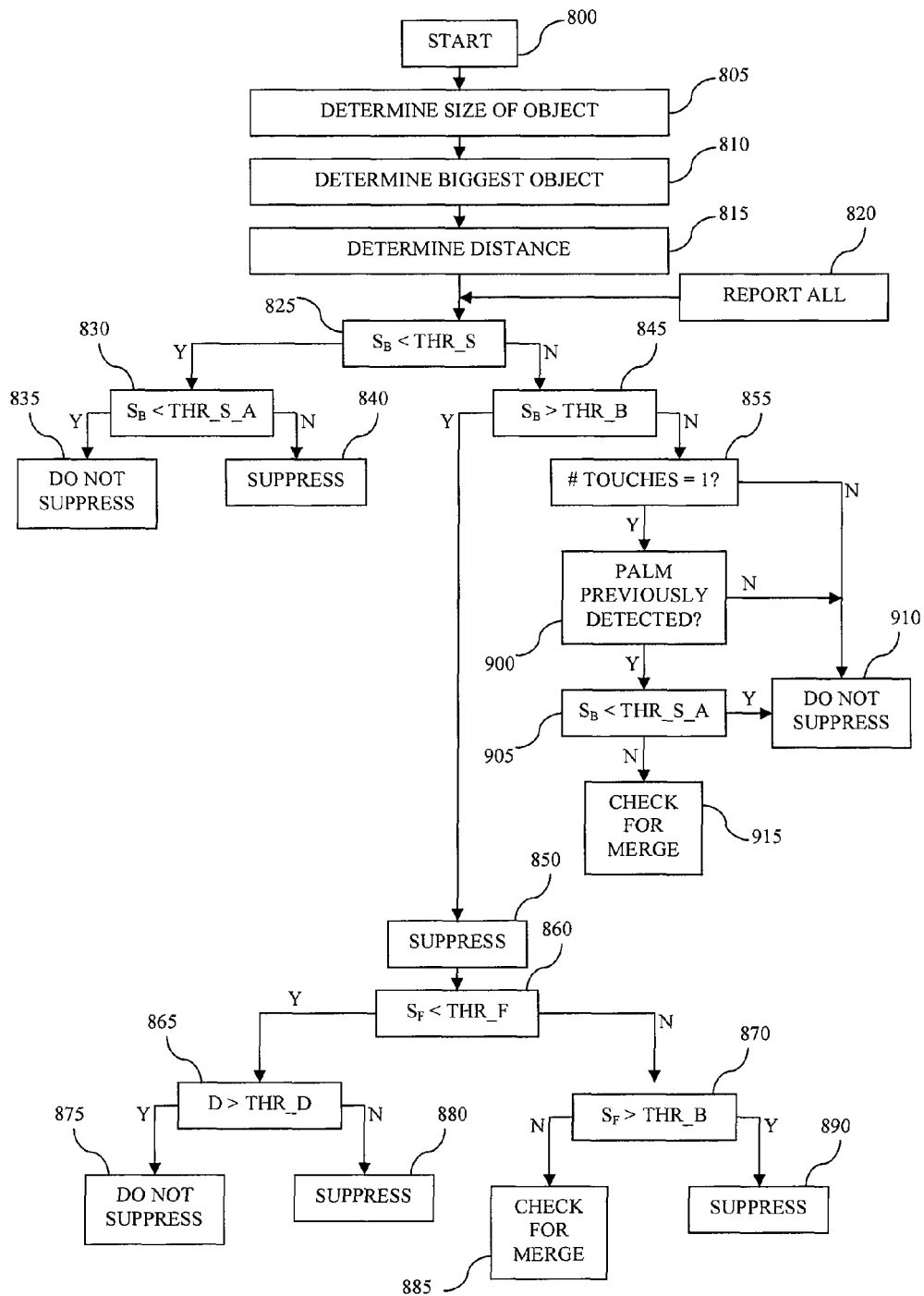
FIG. 12 is a flow chart depicting another example of a process for suppressing non-purposeful touches detected at a touch sensitive screen.

FIG. 12 illustrates another process for detecting and suppressing inadvertent touches from physical objects detected at one or more nodes of a touch screen 20. Again, the touch screen 20 includes associated supporting electronics, as described in more detail with reference to FIG. 11. Also, the touch screen 20, (which is sometime referred to as a touch panel) can be incorporated into various types of computing devices. For example, a tablet PC 10. The process begins at step 800. At step 805 the size of one or more detected objects are determined. The size of the detected object is determined at step 805 using full-threshold detection and half-threshold detection as discussed above with reference to FIG. 9. At step 810, if more than one detected object is identified, then it is determined which detected object is the largest object. If a single objected is detected at the screen 20, then that detected object is determined to be the biggest object.

At step 815 the distance between the largest detected object and each of the other detected objects is determined. At step 820 all of the determinations made at steps 805 to 815 may be reported to other components of the computing device 10 for processing purposes, but may not be indicated on the screen. That is, movement of the cursor or other point object may not be shown to the user.

At step 825 it is determined whether the size of the largest detected object (SB) is smaller than a first small detected object threshold (THR_S). The first small detected object threshold (THR_S) is a predetermined threshold that when the size of a detected object does not exceed (or in some cases equal) the threshold, then the detected object is considered to be small. The first small detected object threshold THR_S is used with detected objects that are detected using full-threshold detection. If the largest detected object (SB) has a size that does not exceed THR_S, then the process moves to step 830.

At step 830 the process determines whether the size of the largest detected object (SB) is smaller than a second small detected object threshold THR_S_A. The second small detected object threshold THR_S_A is a predetermined threshold that indicates the size of a detected object, below which the detected object is considered to be small. The second small detected object threshold THR_S_A is used with detected objects detected using half-threshold detection. If the largest detected object (SB) has a size that does not exceed THR_S_A, then the touch detections associated with the detected object are not suppressed at step 835, because the detected object is considered to be a stylus or something similar such as a user's finger. If the largest detected object (SB) has a size that exceeds or is equal to THR_S_A, then the touch detections associated with the detected object are suppressed at step 840, because the largest detected object (SB) is considered to be a user's hand, palm, or some other large physical object.

Returning to step 825, if the largest detected object (SB) has a size that exceeds or is equal to the first small detected object threshold THR_S, then the process moves onto step 845 At step 845 it is determined whether the size of the largest detected object (SB) is greater than a large detected object threshold THR_B. The large detected object threshold THR_B is a predetermined threshold that indicates the size of an object, above which the object is considered to be large. The threshold THR_B is used for detected objects using full-threshold detection. If the largest detected object (SB) has a size which is greater than the large detected object threshold THR_B, then the touch detections associated with the largest detected object (SB) are suppressed at step 850, because the detected object is considered to be a large physical object such as the user's hand or palm.

If the largest detected object (SB) has a size that does not exceed or is equal to the large detected object threshold THR_B (but is larger than the first small detected object threshold THR_S as previously determined at step 825), then the process moves to step 855. At step 855 historical data is used to determine whether the number of touch detections previously detected at substantially the same screen position equals one (i.e. was an object used to tap the screen repeatedly?). If the number of previous touch detections at substantially the same screen location equals one, then historical data is used to determined whether a large physical object (e.g., a palm) was previously detected at the screen at step 900.

If a large physical object was previously detected, then the process moves to step 905 where the process determines whether the size of the largest detected object (SB) is less than the second small detected object threshold THR_S_A. If the size of the largest detected object (SB) exceeds or is equal to the second small detected object threshold THR_S_A, then the process moves on to step 915.

At step 915 a check is performed to determine whether there have been any previous merging of detected objects into a large detected object as described in FIG. 7.

If the process determines at step 855 that the number of touch detections does not equal 1 (for example, there has been tapping at the screen), if it is determined at step 900 that a large physical object has not been previously detected, or if at step 905 it is determined that the size of the largest detected object (SB) is smaller than the second small detected object threshold THR_S_A, then the touch detections associated with the detected object are not suppressed at step 910, the touch is reported as a finger/stylus.

Although the touches associated with the largest detected object are suppressed at step 850, the panel 20 and associated electronics continue to track the stylus (or user's finger), therefore the process moves on to step 860. At step 860 the process determines whether the size of the furthest object (SF), determined at step 815, is smaller than a finger threshold THR_F. The finger threshold THR_F is a predetermined threshold that indicates the size of a finger (or stylus), below which the object is considered to be a finger (or stylus). The finger threshold THR_F is used for objects detected using the full-threshold detection. If the furthest object (SF) has a size that does not exceed the finger threshold THR_F, then the process moves to step 865. If the furthest object (SF) has a size which exceeds, or in some instances is equal to, the finger threshold THR_F, then the process moves to step 870.

At step 865 the process determines whether the distance (D) between the furthest detected object and the largest detected object, determined at step 815, exceeds a distance threshold THR_D. The distance threshold THR_D is a predetermined threshold which indicates a distance, above which the detected object is considered to be a separate object, and below which, or equal to which, the detected object is considered to be part of the larger object. If the distance (D) exceeds the distance threshold THR_D, then the process moves to step 875 and the touch detections associated with the object are not suppressed, because the detected object is considered to be a stylus (or the user's finger) separate from the suppressed large object. However, if the distance (D) does not exceed the distance threshold THR_D, or equals the distance threshold THR_D, then the process moves to step 880 and the touch detections associated with the detected object are suppressed, because the detected object is considered to be part of a large physical object such as the user's hand or palm.

Returning to step 860, if the furthest detected object (SF) has a size that exceeds, or in some instances is equal to, a finger threshold THR_F then the process moves to step 870. At step 870, the process determines whether the furthest detected object (SF) has a size that exceeds the large detected object threshold THR_B. If the furthest detected object (SF) has a size which is larger than the large detected object threshold THR_B, then the process moves to step 890 and the touch detections associated with the detected object are suppressed. In this instance, both the biggest object and the furthest object are suppressed since both have a size greater then the large detected object threshold THR_B, i.e. there are two palms at the screen. However, if the furthest detected object (SF) has a size which does not exceed, or in some instance is equal to, the large detected object threshold THR_B, then the process moves to step 885 and a check is performed for merged detected objects. In this instance, the furthest object is smaller than a palm (its size is less than the large detected object threshold THR_B).

In one example, a 10.5 inch screen may contain thirty-three drive electrodes and forty-two sense electrodes provided at a density of five mm. In this example, the first small detected object threshold THR_S may be set to ten nodes; the second small detected object threshold THR_S_A may be set to sixteen nodes; the large detected object threshold THR_B may be set to thirty-six nodes; the finger threshold THR_F may be set to twenty-six nodes; and the distance threshold THR_D may be set to five nodes. One or more of the various threshold can be set to different values. In some applications, the thresholds can be configured by the user or adjusted automatically and dynamically during operation based on performance.

Figure 13:
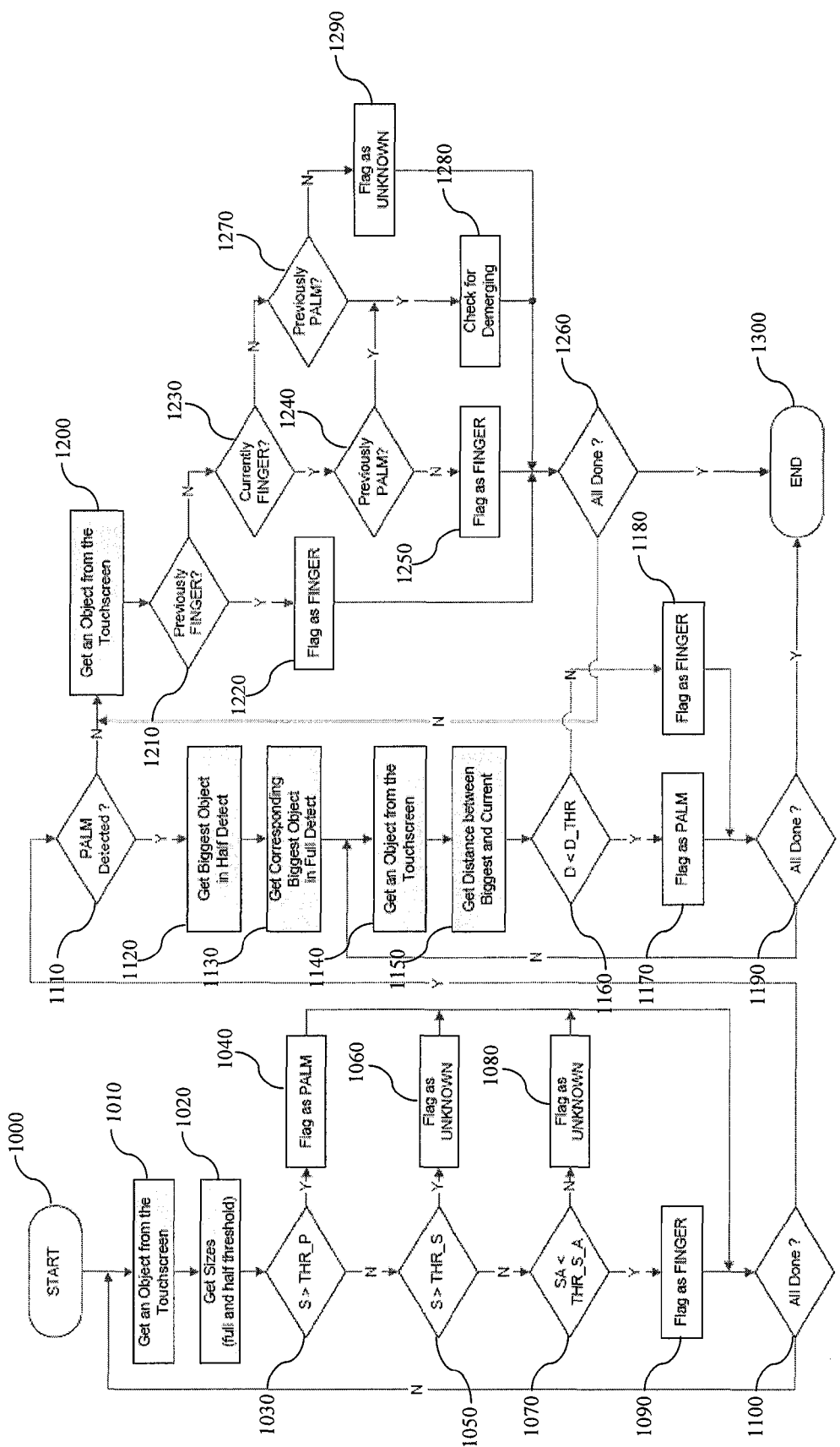
FIG. 13 is a flow chart depicting another example of a process for suppressing non-purposeful touches detected at a touch sensitive screen.

FIG. 13 illustrates another exemplary process for suppressing non-purposeful touches from physical objects detected at a touch sensitive screen 20. Again, the touch screen 20 includes associated supporting electronics, as described in more detail with reference to FIG. 11. Also, the touch screen 20, (which is sometime referred to as a touch panel) can be incorporated into various types of computing devices. For example, a tablet PC 10. The process begins at step 1000. At least one physical object is detected at the touch screen and the coordinates of each detected object are determined using various methods. Then at step 1010 one of the detected objects is selected for processing. At step 1020 the size of the detected object is determined using the full-detection threshold and the half-detection threshold as discussed above with reference to FIG. 9.

At step 1030 the process determines whether the size (S) of the detected object, determined using the full-detection threshold, is greater than a large detected object threshold (THR_P). The large detected object threshold (THR_P) is a predetermined threshold. When the size of a detected object determined using the full-detection threshold exceeds the large detected object threshold (THR_P) the detected object is considered to be a palm or some other large physical object. If the size of the detected object is greater than the large detected object threshold (S>THR_P), then a flag is set at step 1040 indicating that the detected object is a palm. If the size of the detected object is less than or equal to the large detected object threshold (S≤THR_P), then the process moves to step 1050.

At step 1050 the process determines whether the size (S) of the detected object determined using the full-detection threshold, is greater than a small detected object threshold (THR_S). The small detected object threshold (THR_S) is a predetermined threshold. When the size of a detected object determined using the full-detection threshold, exceeds the small detected object threshold (THR_S) the detected object is considered to be unknown. The detected object is considered to be unknown because it has previously been determined at step 1030 that the detected object's size is less than or equal to the large detected object threshold and it has been determined at step 1050 that the objects size is greater than the small object threshold, so it is not known whether the detected object is a finger (e.g., a small physical object) or a palm (a large physical object). The detected object has an intermediate size between the small detected object threshold (size of a finger) and the large detected object threshold (size of a palm). If the size of the detected object is greater than the small detected object threshold (S>THR_S), then a flag is set at step 1060 indicating that the detected object is unknown. If the size of the object is less than or equal to the small detected object threshold (S≤THR_S), then the process moves to step 1070.

At step 1070 the process determines whether the size (SA) of the detected object determined using the half-detection threshold, is less than a small detected object half-detection threshold (THR_S_A). The small detected object half-detection threshold THR_S_A is a predetermined threshold that indicates the size of a detected object using the half-detection threshold, below which the object is considered to be a small physical object such as a finger. If the size of the detected object is less than the small detected object half-detection threshold (SA<THR_S_A), then a flag is set at step 1090 indicating that the detected object is a finger. However, if the size of the detected object is greater than or equal to the small detected object half-detection threshold (SA≥THR_S_A), then a flag is set at step 1080 indicating that the detected object is unknown. The detected object has an intermediate size between the small detected object half-detection threshold and the large detected object threshold (size of a palm).

At step 1100 is it determined whether each of the detected objects have been processed in steps 1010 to 1090. If each of the detected object have not been processed, then the method returns to step 1010 and the next detected object is selected for processing. This loop continues until each of the detected objects are processed. Once each of the detected objects have been processed (i.e. each detected object has been marked with an appropriate flag to indicate whether the detected object is a finger, palm or unknown) the process moves to step 1110.

At step 1110 is it determined whether a large physical object such as a palm has been detected at the screen 20 using the touch detections as previously described, with reference to steps 1010 to 1100. If a palm has been detected then the process moves to step 1120. If a palm has not been detected at the screen then the process moves to step 1200. At step 1110 two assumptions are made. The first is that two palms cannot be present at the same time at the screen 20. The second is that if several fingers are merged together, the resultant detected object would have a size which is less than the large detected object threshold (THR_P) and thus would not be categorized as a palm.

At step 1120 the largest detected object detected using the half-detection threshold is identified. Then at step 1130 the corresponding largest detected object using the full-detection threshold is identified. The largest detected object will be the object flagged as a palm. The corresponding detected object may be identified, for example, by identifying the coordinates of the largest detected object detected using the half-detection threshold and then identifying the corresponding largest detected object present at substantially the same coordinates detected using the full-detection threshold. The coordinates are only substantially the same since the detected object using the half-detection threshold will be larger than the detected object using the full-detection threshold.

At step 1140 one of the other detected objects (not the largest object) is selected. At step 1150 the distance D between the selected (current) detected object and the largest detected object (palm) is determined.

At step 1160 it is determined whether the distance D between the selected (current) detected object and the largest detected object is less than a predetermined distance threshold (D_THR). If the distance between the selected (current) detected object and the largest detected object is less than the predetermined distance threshold (D<D_THR), then the selected (current) detected object is determined to form part of the largest detected object and a flag is set at step 1170 indicating that the detected object is a large object such as a palm. If the distance between the selected (current) detected object and the largest detected object is greater than or equal to the predetermined distance threshold (D≥D_THR), then selected (current) detected object is determined to be a separate detected object from the largest detected object and a flag is set at step 11780 indicating that the detected object is a finger.

At step 1190 a check is performed to confirm whether each of the detected objects has been processed with reference to the largest detected object. If each of the detected objects has not been processed, then the process returns to step 1140 and another detected object is selected and steps 1150 to 1190 are performed again, until all of the object present at the screen have been processed. Once all of the detected objects have been processed, then the process moves to step 1300 and the process is ended.

Returning to step 1110, if a palm has not been detected at the touch screen, then it is known that all of the detected objects are either flagged as a finger or flagged as unknown, and the process moves on to step 1200. At step 1200 a detected object is selected from the objects detected at the touch screen. At step 1210 it is determined whether the selected detected object was previously flagged as a finger. In order to determine whether the selected detected object was previously flagged as a finger, historical data is used. If during a previous cycle of the process, the detected object was flagged as a finger, then at step 1220 the detected object is flagged as a finger again. In this way it is possible to track an object on a cycle by cycle basis consistently.

The process then moves to step 1260 where it is determined whether each of the detected objects detected at the touch screen has been processed. If each of the detected objects have not been processed, then the process returns to step 1200 and another detected object is selected for processing. However, if each of the detected objects have been processed, then the process moves to step 1300 and the process is ended.

If at step 1210 it is determined that the selected detected object was not previously flagged as a finger, then it is determined at step 1230 whether the selected detected object is currently flagged as a finger. If the selected detected object is currently flagged as a finger then the process moves to step 1240.

At step 1240 it is determined whether the selected detected object was previously flagged as a palm. If the selected detected object was not previously flagged as a palm, then the process moves to step 1250 and the detected object is flagged as a finger. The process then moves on to step 1260 where it is determined whether each of the detected objects detected at the touch screen has been processed. If all of the detected objects have not been processed, then the process returns to step 1200 and another detected object is selected. If all of the detected objects have been processed, then the process moves to step 1300 and the process is ended.

Returning to step 1230, if the selected detected object is not currently flagged as a finger, then the process moves on to step 1270. At step 1270 it is determined whether the selected detected object was previously flagged as a palm. If the selected detected object was not previously flagged as a palm, then process moves to step 1290 and the detected object is flagged as unknown. The process then moves on to step 1260 where it is determined whether each of the detected objects detected at the touch screen has been processed. If each of the detected objects have not been processed, then the process returns to step 1200 and another detected object is selected. If each of the detected objects have been processed, then the process moves on to step 1300 and the process is ended.

Returning to steps 1240 and 1270, if the selected detected object was previously flagged as a palm, then the process moves to step 1280 and a check for demerging is performed. Following the check for demerging, the process then moves to step 1260 where it is determined whether each of the detected objects has been processed. If each of the detected objects have not been processed, then the process returns to step 1200 and another detected object is selected. If each of the detected objects have been processed, then the process moves to step 1300 and the process is ended.

The demerging process is a separate process which is used when a palm was detected during the previous cycle, but was not detected during the current cycle and a finger or unknown object is detected during the current cycle. In most instance, the current detected object which is indicated to be a finger or an unknown object should in fact be flagged as a palm, as it was previously flagged as a palm. However, this is not the case when the distance between the finger or unknown detected object during the current cycle and the palm detected during the previous cycle is greater than the distance threshold (D_THR). In this instance, the finger or unknown detected object is a separate object from the palm and so is required to be demerged from the palm. The distance threshold D_THR is altered when a detected object is moved towards the palm, so demerging of the detected object happens at the increased distance threshold D_THR. The objects which are flagged as a palm by the process of FIG. 13 are suppressed.

FIG. 11 illustrates schematically apparatus for detecting and processing a touch at a touch sensitive screen 620. In this example the touch screen 620 comprises a plurality of drive electrodes connected to the drive channels 660 and a plurality of sense electrodes connected to the sense channels 650. The drive and sense channels 650, 660 are connected to a control unit 700 via a connector 670. The control unit 700 may be provided as a single integrated circuit chip such as a general purpose microprocessor, a microcontroller, a programmable logic device/array, an application-specific integrated circuit (ASIC), or a combination thereof. In one example the control unit 700 includes a drive unit 710, a sense unit 720, a storage device 730 and a processor unit 740. The processor unit 740 is capable of processing data from the sense unit 720 and determining a touch as well as determining whether to suppress reporting of or other response to a touch in accordance with one or more of the processes described above. In an implementation where the processing unit 740 is a programmable device, the programming for configuring the processing to determine position of any touch on the screen and to suppress reporting of any touch determined to be inadvertent may reside in the storage device 730. In one example, the drive unit 710, sense unit 720 and processor unit 740 may all be provided in separate control units 700.

Although the above description refers to a touch pad having a touch sensitive screen 20, the touch sensitive screen can equally be attached to numerous electronic devices, such as computers, personal digital assistants (PDA), satellite navigation devices, mobile phones, portable media players, portable game consoles, public information kiosks, point of sale systems etc. These electronic devices may include a central processor or other processing device for executing program instructions, an internal communication bus, various types of memory or storage media (RAM, ROM, EEPROM, cache memory, disk drives etc.) for code and data storage, and one or more network interface cards or ports for communication purposes. In the example of FIG. 11, the suppression of response to inadvertent touches may be implemented in the control unit 700. However, those skilled in the art will recognize that another approach might use a touch screen and control unit that does not distinguish the touches and suppress response to inadvertent touches but instead involves programming of the processor of the data device to identify inadvertent touches and suppress responses to such touches.

As shown by the above discussion, at least some implementations for suppressing a response to an non-purposeful touch of the screen may involve programming, for example, for the processor unit in the touch screen control or for the processor of the computer or other device that incorporates the touch screen. Program aspects of the technology may be thought of as "products" or "articles of manufacture" typically in the form of executable code and/or associated data that is carried on or embodied in a type of machine readable medium. "Storage" type media include any or all of the memory of the supporting electronics of the touch screen, computing devices, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Hence, a machine readable medium may take many forms, including but not limited to, a tangible non-transitory storage medium, a carrier wave medium or physical transmission medium. Tangible non-volatile storage media include, for example, optical or magnetic disks, such as any of the storage devices in any computer(s) or the like. Tangible volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Many of these forms of computer readable media may be involved in carrying one or more sequences of one or more instructions to a processor for execution Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

The invention claimed is:

1. A method, comprising:
sensing touch detections at a touch screen;
comparing the touch detections to a pattern of touch;
grouping, based at least in part on the comparing the touch detections to a pattern of touch detections, the touch detections into at least one detected object;
calculating the size of each detected object, the size of each detected object comprising a number of nodes associated with the detected object;
comparing the size of each detected object to a size threshold, the size threshold comprising a threshold number of nodes, comparing the size of each detected object to the size threshold comprising comparing the number of nodes associated with the detected object to the threshold number of nodes;
reporting the touch detections from each detected object that is less than the size threshold; and
suppressing a response to each detected object greater than the size threshold;
calculating the distance between each of the detected objects;
determining which two detected objects are the furthest from each other;

calculating a ratio of the sizes of the two detected objects furthest from each other; and suppressing a response to the larger of the two detected objects furthest from each other based at least in part on the ratio.

2. The method of claim 1, further comprising determining that more than one physical object touched the touch screen.

3. The method of claim 2, wherein determining whether more than one physical objects touched the touch screen comprises determining whether touch detections occurred at adjacent nodes within the touch screen.

4. The method of claim 1, wherein calculating the size of each detected object comprises determining the number of adjacent nodes within a touch detection area of the touch screen.

5. The method of claim 1, wherein comparing the size of each detected object to a threshold comprises determining whether the larger of the two detected objects that are further from each other exceeds the threshold.

6. The method of claim 1, further comprising:
calculating a distance between two detected objects;
comparing the distance between the two detected objects to a distance threshold; and
determining that the two detected objects are part of the same detected object when the distance between the two detected objects is less than the distance threshold.

7. The method of claim 1, wherein:
sensing one or more touch detections comprises detecting a change in capacitance at a node exceeds either of a first detection threshold and a second detection threshold;
calculating the size of a detected object comprises determining the number of touch detections that exceed each of the first detection threshold and the second detection threshold;
comparing the size of the each detected object to a size threshold comprises comparing the number of touch detections that exceed the first detection threshold and the number of touch detections that exceed the second detection threshold to a respective size threshold; and
suppressing the response from each detected object greater than the size threshold comprises suppressing the response from the detected object when the number of touch detections that exceed the first detection threshold and the number of touch detections that exceed the second detection threshold exceeds either respective size threshold.

8. A touch panel, comprising:
a control unit having storage device, a drive unit, a sense unit, and a processor;
a storage device that, when operating, stores executable instructions for the processor; and
a touch screen having a plurality of sense nodes arranged in a pattern, wherein the sense nodes are operable to sense a physical object touching the node;
wherein, the instructions configure the processor so that the control unit is operable to perform operations comprising:
sensing touch detections at a touch screen;
comparing the touch detections to a pattern of touch detections;
grouping, based at least in part on the comparing the touch detections to a pattern of touch detections, the touch detections into at least one detected object;
calculating the size of each detected object, the size of each detected object comprising a number of nodes associated with the detected object;
comparing the size of each detected object to a size threshold, the size threshold comprising a threshold number of nodes, comparing the size of each detected object to the size threshold comprising comparing the number of nodes associated with the detected object to the threshold number of nodes;
reporting the touch detections from each detected object that is less than the size threshold; and
suppressing a response to each detected object greater than the size threshold;
calculating the distance between each of the detected objects and determining which two detected objects are the furthest from each other;
calculating a ratio of the sizes of the two detected objects furthest from each other; and
suppressing a response to the larger of the two detected objects furthest from each other based at least in part on the ratio.

9. The touch panel of claim 8, wherein calculating the size of each detected object comprises determining the number of adjacent nodes within a touch detection area of the panel.

10. The touch panel of claim 8, wherein comparing the size of each detected object to a threshold comprises determining whether the larger of the two detected objects that are further from each other exceeds the threshold.

11. The touch panel of claim 8, wherein the operations further comprise determining whether two detected objects are part of the same detected object by comparing a distance between the two detected objects to a distance threshold.

12. A touch sensitive computing device comprising:
a processing unit;
a touch panel, the touch panel having a control unit configured to control the touch panel and report a touch to the processing unit, the control unit having a processor operable to execute instructions that cause the control unit to suppress one or more touch detections associated with a detected object, the instructions causing the processor to perform operations comprising:
sensing touch detections at a touch screen;
comparing the touch detections to a pattern of touch detections;
grouping, based at least in part on the comparing the touch detections to a pattern of touch detections, the touch detections into at least one detected object;
calculating the size of each detected object, the size of each detected object comprising a number of nodes associated with the detected object;
comparing the size of each detected object to a size threshold, the size threshold comprising a threshold number of nodes, comparing the size of each detected object to the size threshold comprising comparing the number of nodes associated with the detected object to the threshold number of nodes;
reporting the touch detections from each detected object that is less than the size threshold; and
suppressing a response to each detected object greater than the size threshold;
calculating the distance between each of the detected objects and determining which two detected objects are the furthest from each other;
calculating a ratio of the sizes of the two detected objects furthest from each other; and
suppressing a response to the larger of the two detected objects furthest from each other based at least in part on the ratio.

13. The touch sensitive computing device of claim 12, wherein calculating the size of each detected object comprises determining the number of adjacent nodes within a touch detection area of the panel.

14. The touch sensitive computing device of claim 12, wherein comparing the size of each detected object to a threshold comprises determining whether the larger of the two detected objects that are further from each other exceeds the threshold.

15. The touch sensitive computing device of claim 12, wherein the operations further comprise determining whether two detected objects are part of the same detected object by comparing a distance between the two detected objects to a distance threshold.

16. An article of manufacture comprising:
   a machine readable storage medium; and
   executable program instructions embodied in the machine readable storage medium that when executed by a processor of a programmable computing device configures the programmable computing device having a touch panel to perform operations comprising:
      sensing touch detections at a touch screen of the touch panel;
      comparing the touch detections to a pattern of touch detections;
      grouping, based at least in part on the comparing the touch detections to a pattern of touch detections, the touch detections into at least one detected object;
      calculating the size of each detected object, the size of each detected object comprising a number of nodes associated with the detected object;
      comparing the size of each detected object to a size threshold, the size threshold comprising a threshold number of nodes, comparing the size of each detected object to the size threshold comprising comparing the number of nodes associated with the detected object to the threshold number of nodes;
      reporting the touch detections from each detected object that is less than the size threshold; and
      suppressing a response to each detected object greater than the threshold;
      calculating the distance between each of the detected objects and determining which two detected objects are the furthest from each other;
      calculating a ratio of the sizes of the two detected objects furthest from each other; and
      suppressing a response to the larger of the two detected objects furthest from each other based at least in part on the ratio.

17. The article of claim 16, wherein calculating the size of each detected object comprises determining the number of adjacent nodes within a touch detection area of the panel.

18. The article of claim 16, wherein comparing the size of each detected object to a size threshold comprises determining whether the larger of the two detected objects that are further from each other exceeds the size threshold.

19. The article of claim 16, wherein the operations further comprise determining whether two detected objects are part of the same detected object by comparing a distance between the two detected objects to a distance threshold.

* * * * *